(12) United States Patent
Meyer

(10) Patent No.: US 7,201,200 B2
(45) Date of Patent: Apr. 10, 2007

(54) DEVICE AND METHOD FOR APPLYING A STRIP TO A ROTARY SURFACE

(75) Inventor: Daniel Meyer, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 123 days.

(21) Appl. No.: 10/997,862

(22) Filed: Nov. 29, 2004

(65) Prior Publication Data

US 2005/0139324 A1 Jun. 30, 2005

Related U.S. Application Data

(63) Continuation of application No. PCT/EP03/04723, filed on May 6, 2003.

(30) Foreign Application Priority Data

May 29, 2002 (FR) .................................. 02 06871

(51) Int. Cl.
*B29D 30/38* (2006.01)
(52) U.S. Cl. ...................................... 156/397; 156/440
(58) Field of Classification Search ............... 156/117, 156/397, 440
See application file for complete search history.

(56) References Cited

U.S. PATENT DOCUMENTS

| 3,523,854 | A | * | 8/1970 | Cantarutti | 156/397 |
|---|---|---|---|---|---|
| 3,761,341 | A | * | 9/1973 | Kimble | 156/446 |
| 4,874,455 | A | | 10/1989 | Ginter | |
| 5,002,621 | A | | 3/1991 | Ikeda | |
| 5,192,390 | A | * | 3/1993 | Perkins | 156/425 |
| 5,535,801 | A | * | 7/1996 | Iseki et al. | 152/528 |
| 5,863,368 | A | | 1/1999 | Perrin | |
| 6,554,041 | B1 | * | 4/2003 | Ohki et al. | 156/397 |
| 2002/0062910 | A1 | | 5/2002 | Meyer | |

* cited by examiner

Primary Examiner—Geoffrey L. Knable
(74) Attorney, Agent, or Firm—Buchanan Ingersoll & Rooney PC

(57) ABSTRACT

A reinforcement strip is laid on a rotating receiving surface during the manufacture of a tire. The strip passes through a guide which is moved alternatingly transversely relative to a travel path of the strip, whereby the strip is laid in an undulating pattern on the receiving surface. The amplitude of the alternating transverse movement is varied as a function of a ratio of: (a) the speed of a portion of the strip approaching the guide, and (b) the speed of the receiving surface. Between the guide and the receiving surface the strip is pivoted by 90 degrees about the strip's longitudinal axis so as to be laid tangentially on the receiving surface.

8 Claims, 4 Drawing Sheets

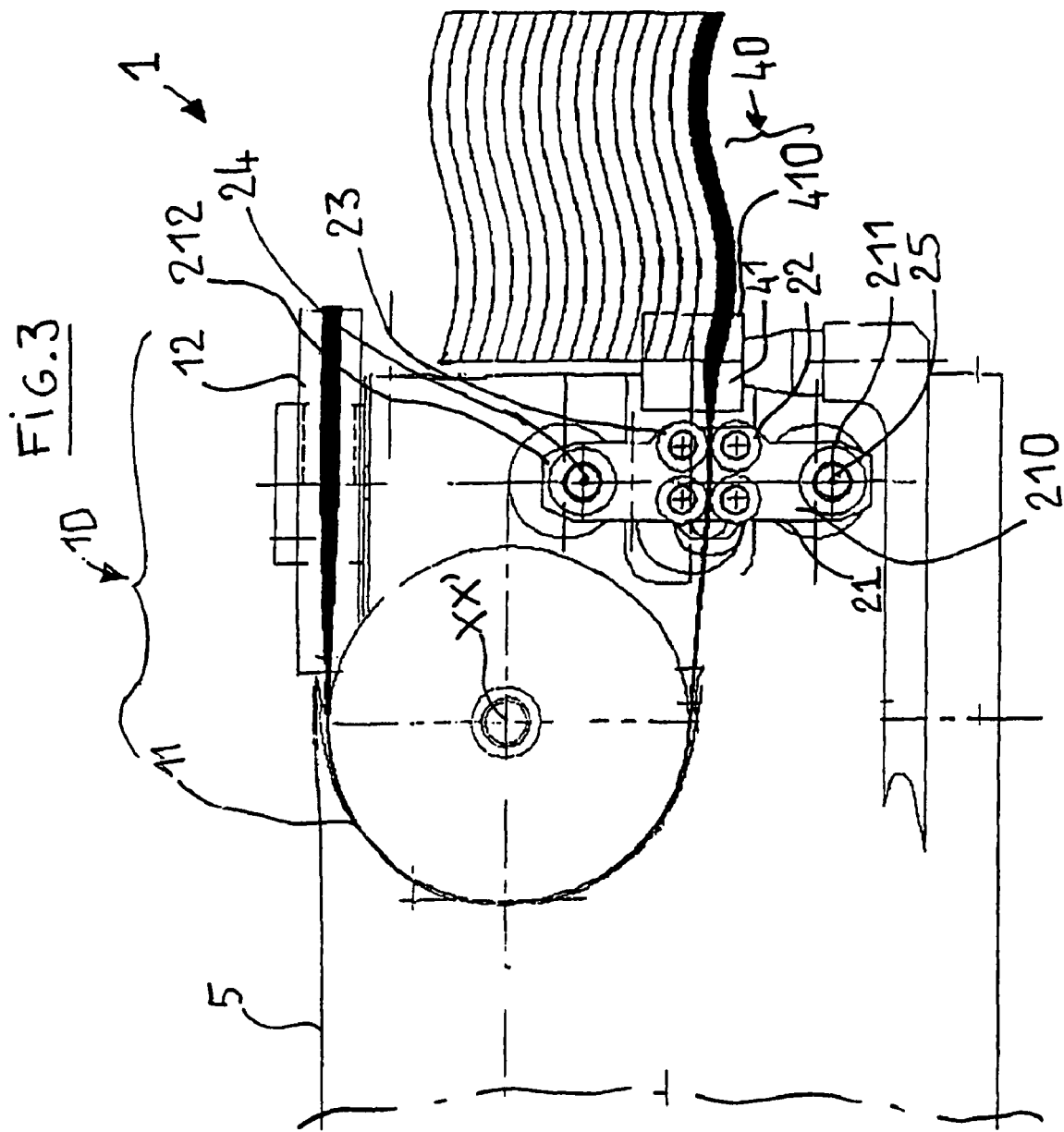

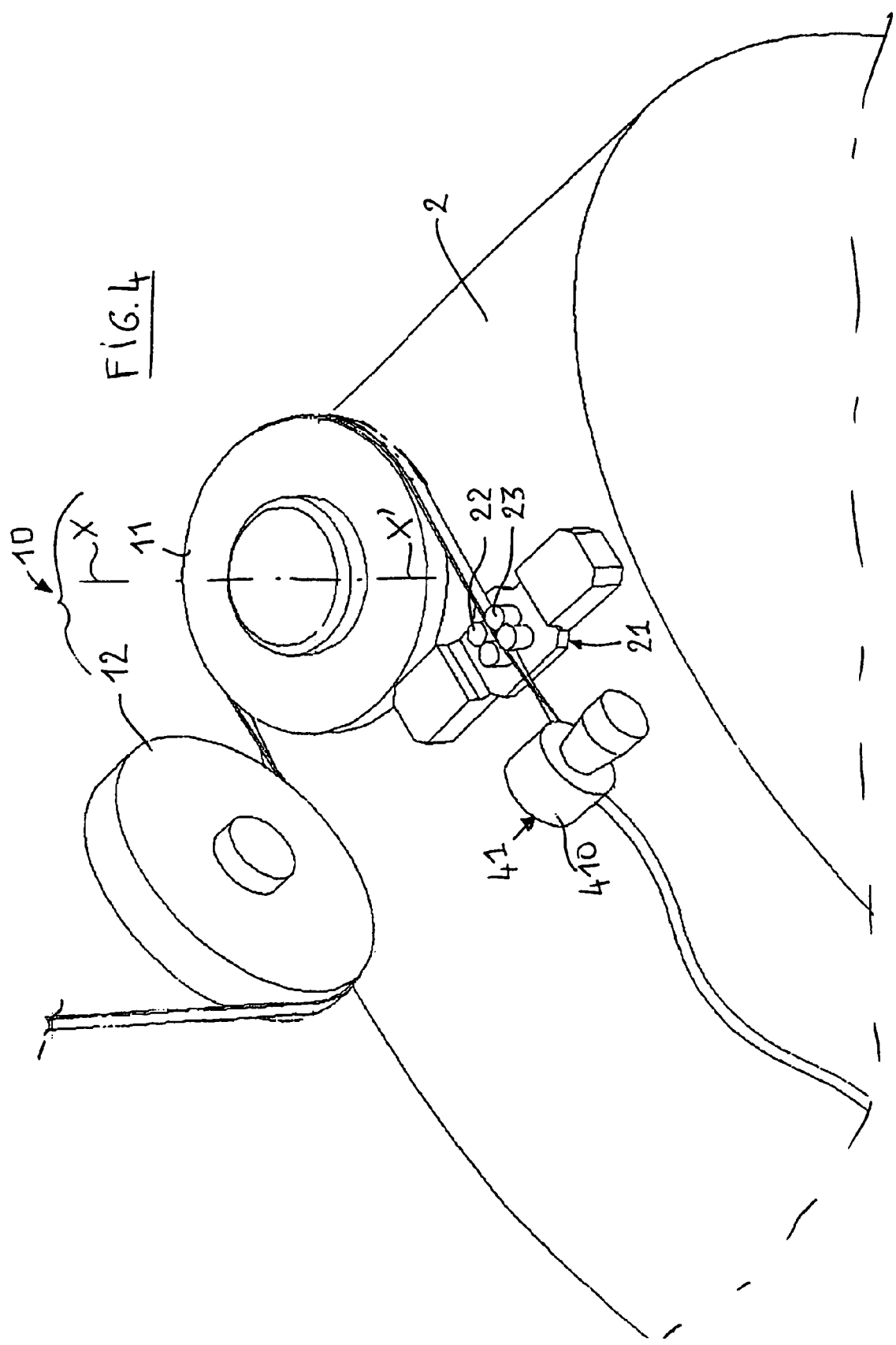

DEVICE AND METHOD FOR APPLYING A STRIP TO A ROTARY SURFACE

Figure 1:
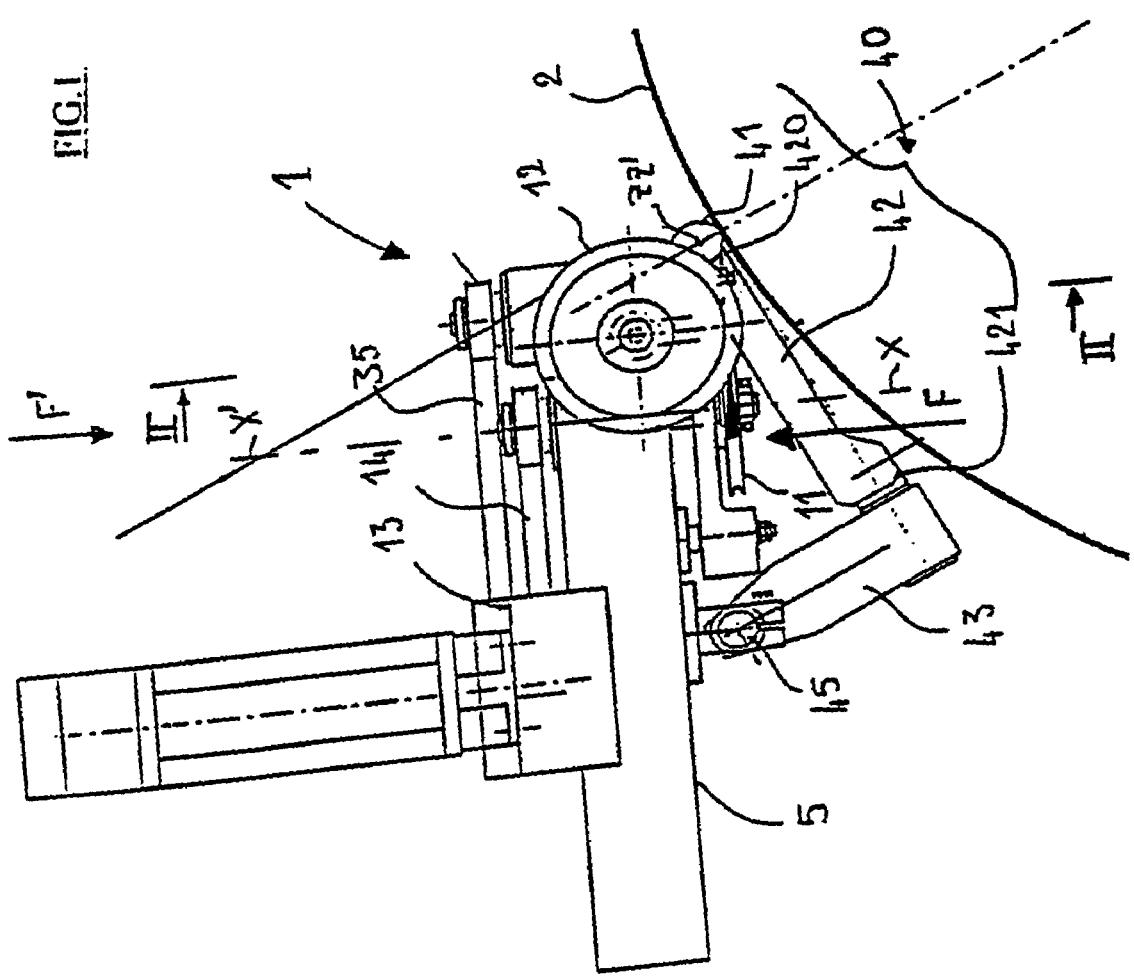

This application is a continuation of International Application PCT/EP03/04723 filed on May 6, 2003 and which claims priority of patent application Ser. No. 02/06871 filed in France on May 29, 2002.

The invention relates to apparatus for applying a reinforcement strip to a receiving rotary surface, in particular for manufacturing tyres.

The advantage of providing an annular reinforcement in tyres over their entire periphery has long been recognised. A reinforcement of this kind may in particular be formed by the one ply comprising cords wound in the circumferential direction and arranged radially on the carcass of the tyre. This ply is commonly called a "zero-degree ply". A cord of textile or metal means a single yarn or a plurality of yarns joined together in such a way that they may be worked on together, or indeed, by extension, a twisted yarn.

During vulcanisation of tyres having a zero-degree ply, the cords of this ply undergo shaping in the vulcanising mould, and this shaping has to be taken into account in the final structure of the tyres. This phenomenon may give rise to major problems in cases where the cords making up the ply do not undergo elongation when shaped in the mould, as a result of their rigidity.

Various solutions have been envisaged to solve this problem. Some relate to the nature of the cords: for example, the use of metal yarns known as "bielastic" allows a compromise to be reached between the properties of rigidity and of elongation in the ply obtained. Although this is advantageous, a solution of this kind is not without effect on the nature of the tyre reinforcement. It becomes necessary to compensate for the lowering of the rigidity of the zero-degree ply obtained by adding supplementary plies or modifying the rubber mixes.

Another type of solution proposes modifications to the way the uncured products are laid, allowing the desired structures to be obtained in the vulcanised products. The idea has thus been put forward that the cords be laid in an undulating shape in the uncured tyre such that once they have been shaped in the vulcanising mould they are no longer undulating but are then oriented uniformly in a direction forming an angle close to zero degrees with the circumferential direction.

This ingenious solution does, however, present difficulties in its implementation.

The uncured tyre is in fact assembled on a cylindrical or slightly cambered drum, whereas the vulcanised tyre which emerges from the vulcanising mould has too much camber by comparison with this first shape. Consequently, at the time of shaping, the deformations the tyre undergoes will be much more pronounced at the centre of the said tyre than at its shoulders. An industrial method must therefore be found of laying a cord which has undulations of different amplitudes and wavelengths, depending on its transverse position, so that once the ply produced has been shaped in the press it has yarns oriented at substantially zero degrees, whatever their transverse position, be it close to the centre or to the shoulders.

EP 0 724 949 describes apparatus for applying textile or metal yarns to a rotary surface with sinusoidal undulations. Means of displacing yarns in traverse translational motion with respect to the direction in which the yarns are supplied allows laying of this kind to be achieved, with the amplitude and wavelength of the sinusoidal shape being controlled as a result of monitoring and controlling the speeds of rotation of the laying surface, the element supplying the yarns and control of the displacement means. However, these displacement means are formed by a thread guide which may be moved in translation in the transverse direction and is actuated by a motor by way of a connecting rod fixed to a motor-driven flywheel.

In practice, this means that, once the speed of rotation of the laying surface has been determined, to modify the amplitude of the undulations of the yarns on this surface continuously, the speed of the element supplying the yarns has to be modified in order to modify the quantity of yarns supplied, and the position of the connecting rod with respect to the flywheel has to be modified in order to synchronise the modification of the amplitude of the undulations created. Thus, it is difficult to find a way to bring about this last modification continuously. Moreover, it is clear that, depending on the desired sinusoidal shape, the speed of laying will also be limited so that the motor-driven movement of the thread guide is not obstructed.

EP 1 208 963 provides an initial solution to the difficulties mentioned above, but is still limited to laying a single yarn or cord.

However, it has proved advantageous, in order to improve the time it takes to lay the ply, to wind not just a single yarn or cord but a continuous set of yarns or cords arranged parallel to each other and forming a reinforcement strip. The yarns or cords extend in the direction of the length of the strip and are generally coated in a rubber mix. In this case the desired number of yarns or cords is deposited over a smaller number of turns of the receiving surface.

However, laying a strip with sinusoidal undulations on a tyre crown is subject to a range of difficulties connected to the low lateral shear strength of the strip and possibly giving rise to undesirable deformations or the strip folding back on itself and to part of the crown not being covered.

The object of the invention is to find applying apparatus which allows a plurality of cords to be applied simultaneously in the form of a reinforcement strip and overcomes all the disadvantages mentioned above.

According to the invention, the apparatus for applying a reinforcement strip to a receiving rotary surface comprises means of supplying the strip, means of transverse displacement with respect to the receiving surface, and means of laying the strip on the said receiving surface, and it is characterised in that the means of supplying the strip bring the latter to the means of transverse displacement with the plane of the ply of yarns or cords of the strip oriented substantially perpendicular to the axis of rotation of the receiving rotary surface, and in that the means of laying the strip, which are located at the exit of the means of transverse displacement, perform a pivoting through 90° of the plane of the ply of yarns or cords of the said strip about an axis parallel to the direction in which the strip progresses, in order to arrange the plane of the ply of yarns or cords of the strip tangentially with respect to the receiving surface.

This specific orientation of the plane of the ply of the yarns or cords forming the strip during the transverse displacement makes it possible for each cord of the strip to undergo the undulations simultaneously, without acting on the width of the strip and in particular without the risk of deforming the strip. Once the strip has been pivoted it can be laid tangentially on the receiving surface with the undulations produced in this way.

The number of yarns or cords deposited simultaneously is generally much lower than the number of yarns forming the "zero-degree ply" once it has been laid. This number is determined in dependence on the maximum width of the strip which can be used. This width is established empirically as a function of the rigidity of the yarns or cords and the amplitude of the undulations, and may be between a few millimeters and several tens of millimeters. For the sake of convenience and standardisation, it is generally between 10 and 20 mm with the strip comprising at least two and up to several tens of yarns and cords, depending on the diameter and the arrangement of the latter.

The invention also relates to a process of applying a reinforcement strip to a receiving rotary surface, in particular for manufacturing tyres, which comprises the following steps:

a strip whereof the plane of the ply of yarns or cords of the strip is oriented substantially perpendicular to the axis of rotation of the receiving surface is supplied;

the strip is displaced alternately, in a direction perpendicular to the plane of the ply of yarns or cords of the strip, in order to produce undulations on the latter;

the strip is pivoted through 90° about an axis parallel to the direction in which the strip progresses, and the latter is laid tangentially on the receiving rotary surface.

Figure 2:
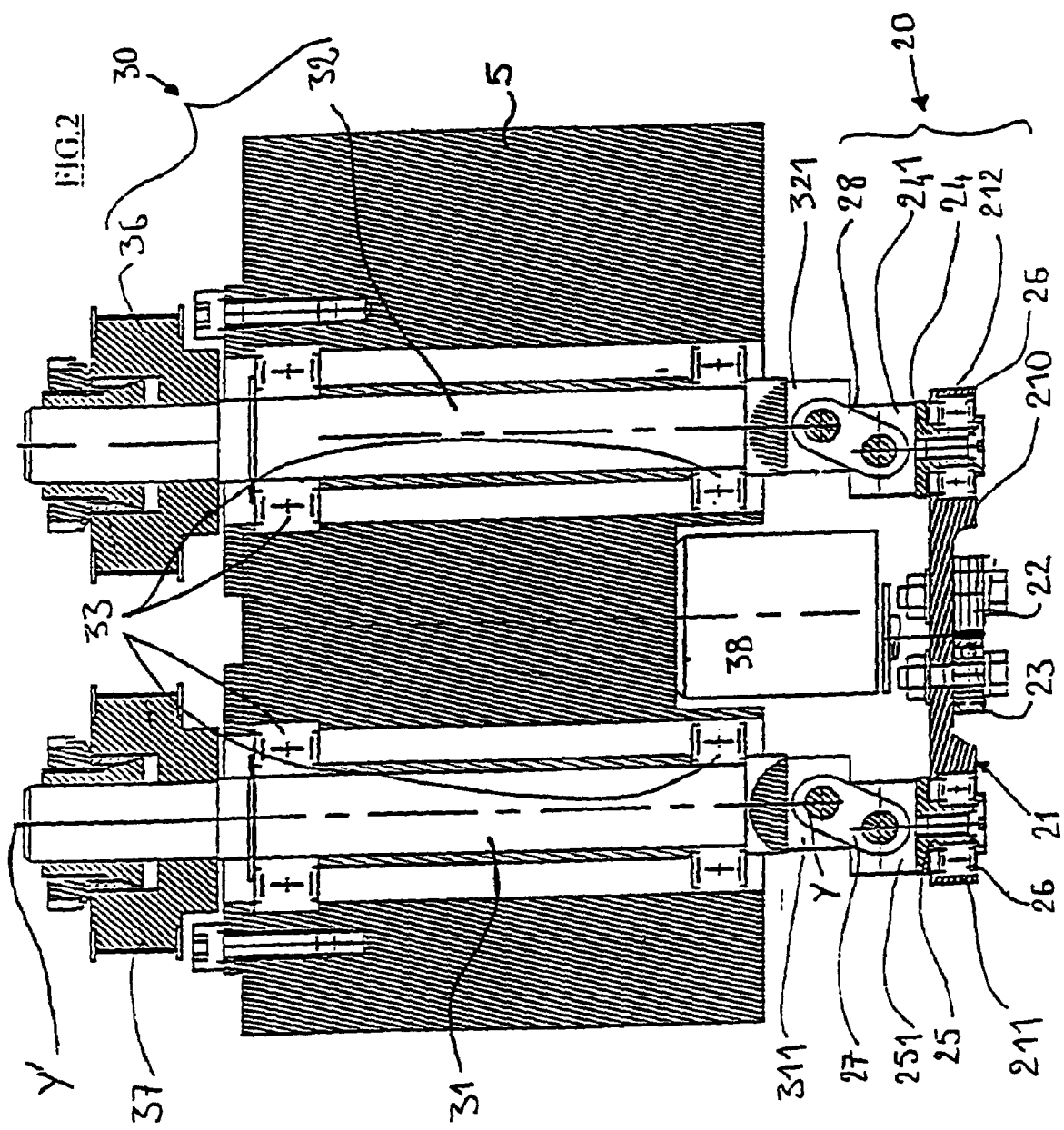

Other features and advantages of the invention will become apparent on reading the description of an example embodiment of apparatus for applying a reinforcement strip according to the invention, with reference to the drawings, in which:

FIG. 1 is a diagrammatic illustration in lateral elevation of the applying apparatus according to the invention, FIG. 2 is a partial section of the applying apparatus, along the line II illustrated in FIG. 1, FIG. 3 is a partial illustration, seen from below, of the applying apparatus in the direction of the arrow F illustrated in FIG. 1, and FIG. 4 is a partial perspective illustration, seen from above, of the apparatus in the direction of the arrow F' illustrated in FIG. 1.

According to FIG. 1, the apparatus 1 for applying a reinforcement strip B to a receiving rotary surface (2) comprises a body (5), with the strip being applied to the receiving surface (2) in a direction substantially perpendicular to the axis of rotation of the said surface and tangentially thereto. The receiving surface (2) rotates at a circumferential speed which is monitored and designated as V2.

In the text below, the term "direction in which the strip progresses" is used to mean the direction substantially perpendicular to the axis of rotation of the receiving surface (2).

The body (5) carries means (10) of supplying the strip, means (20, 30) of transverse displacement of the strip and, finally, means (40) of laying this strip on the receiving surface (2). These different members act successively to apply the strip to the receiving surface (2) with the desired undulations in the strip and hence in the yarns or cords within the strip.

As seen in FIG. 4, the supply means (10) comprise at least one infeed pulley (12) for the strip, and this is fed by a supply reel (not illustrated). Here, the axis of rotation of the pulley (12) is parallel to that of the receiving surface 2, which allows the roller easily to feed a capstan (11) whereof the axis XX' is perpendicular to that of the roller (12).

Leaving the pulley (12), the strip is oriented tangentially with respect to the receiving surface (2), but in order to pass the capstan (11) the strip has to pivot through 90° about its longitudinal axis. Leaving the capstan (11), the plane of the ply of yarns or cords making up the strip is oriented perpendicular to the axis of rotation of the receiving surface. The yarns or cords of the strip therefore are all in the same transverse position with respect to the receiving surface, with the direction of each cord corresponding to the direction in which the strip progresses in order to feed the means (20, 30) of transverse displacement of the strip.

Thus, on leaving the capstan everything happens (as seen in elevation) as though there were only one cord to undergo undulations.

The capstan (11) is motor-driven by a motor (13) by way of a transmission belt (14) at a circumferential speed which will be designated V1. Controlling the speed V1, in synchronism with the circumferential speed V2 of the receiving surface (2), allows the quantity of strip supplied to the rotary surface (2) on each rotation thereof to be determined.

The means (20, 30) of displacement are illustrated in more detail in FIGS. 2 and 3 and comprise a guide head (20) cooperating with the means (30) carried in the body (5).

The guide head (20) comprises a connecting arm (21) which is perpendicular to the axis XX' of rotation of the capstan (11) and carries on its face (210) oriented towards the outside of the applying apparatus (1) two guide rollers (22 and 23) whereof the axes are perpendicular to the said connecting arm (21) and mounted to rotate freely with respect to the latter. Because the strip is mounted parallel to the axes of the rollers, the fact that two pairs of rollers are present, as illustrated in FIG. 3, is advantageous in improving guidance of the strip.

To facilitate guidance of the reinforcement strip and to accompany it during its transverse displacement, it is possible to provide for the guide rollers of each pair (22 and 23) to be offset in the direction in which the strip progresses, while being tangential to the straight line that passes in the direction in which the strip progresses and through the centre of the connecting arm (21). It is equally possible to arrange the two rollers without any mutual offset, as illustrated in FIGS. 2, 3 and 4.

Shafts (24 and 25) with mutually parallel axis are mounted to rotate freely in the ends (211 and 212) of the connecting arm (21) by way of ball bearings (26), with the axes of the shafts (24 and 25) being perpendicular to the said connecting arm (21).

At the outlet of the connecting arm (21), facing the inner face of the connecting arm (21) with respect to the applying apparatus, shafts (24 and 25) each carry a cap (241, 251).

The means (30) of displacement comprise two shafts (31 and 32) which are parallel to one another and perpendicular to the direction in which the strip progresses, rotating in ball bearings (33) carried by the body (5) and motor-driven by a common motor (not illustrated) which is connected respectively to a drive pulley (36, 37) for each shaft by one and the same transmission belt (35).

At the opening of the body (5) facing the guide head (20), the shaft (31, 32) are extended respectively by caps (311, 321), these caps being connected respectively to the caps (241 and 251) by mutually parallel levers (27 and 28), which ensure the transmission of the motorisation to the shafts (24 and 25).

The speed of rotation of the shafts (31, 32, 24 and 25) will be designated Ω3.

Rotation of the shafts (31 and 32) allows the positioning of the levers (27 and 28) to be alternated as the strip passes. The pivotal movement of the levers (27 and 28) about their axis fixed to the caps (311 and 321) controls the eccentric movement of the connecting arm (21) with respect to the shafts (31 and 32). Thus, the centre of the connecting arm (21) describes a circle in the course of this rotation, projected onto a plane perpendicular to the axis of rotation of the shafts (31 and 32).

Moreover, the body (5) carries on its face parallel to the connecting arm (21) an electromagnet (38) which exerts a restoring force on the connecting arm (21).

The means (40) of laying the strip of the receiving surface (2) comprise a laying roller (41) which rotates freely about its axis of rotation Y and whereof the outer surface of revolution (410) is in contact with the receiving surface (2) such that the strip passes between the said surface of revolution and the receiving surface. This laying roller (41) is located close to the two pairs of guide rollers (22 and 23) so as to take up the strip coming from these rollers and rotates it through 90° such that the plane of the ply of yarn making up the strip is oriented parallel to the receiving surface and hence tangentially thereto.

An arm (42) carries the laying roller (41) at one of its ends (420), the other end (421) of the arm being fixed by way of a support (43) to the body (5), the said support being mounted to pivot on an elastic joint (45) on the body (5) in order to ensure that the strip is applied to the rotary surface (2) with the proper force.

A few comments about operation of the applying apparatus will be given briefly below.

It should be noted that if the speed V2 of rotation of the receiving surface (2) is determined the speed V1 at which the strip is supplied can be regulated to allow the quantity of strip supplied on each rotation of the surface (2) to be fixed.

In the absence of the strip, since the shafts (31 and 32) are rotating, the electromagnet (38) keeps the connecting arm (21) in the raised position with a maximum angular position of the levers (27 and 28) with respect to the caps (311 and 321), and the centre of the connecting arm (21) then describes a circle projected onto a plane parallel to the connecting arm (21). The diameter of this circle corresponds to the maximum possible amplitude of the undulation.

In the presence of a strip, a balance is established between the force exerted by the rollers (22 and 23) under the action of the electromagnet, and the effect of this is to put in an eccentric position the connecting arm (21) and the restoring force exerted by the strip, which will be tensioned under the action of a transverse displacement with respect to the direction in which it progresses.

At a speed V1=V2, the action of the connecting arm (21) does not bring about any transverse displacement of the strip, such that the cords are laid in rectilinear manner.

When the speed V1 of supplying the strip is greater than the speed V2 of the rotary surface, the electromagnet will act on the connecting arm (21) by way of the levers (27 and 28), exerting a transverse thrust on the strip until a balance is set up with the restoring force exerted by the strip tensioned in this way, with rotation of the shafts (31 and 32) resulting in alternation of the position of the levers (27, 28).

It will be noted that where V1 is greater than V2, the speed Ω3 of rotation of the shafts (31 and 32) allows the alternation of the levers (27 and 28) to be determined for each rotation of the receiving surface (2) and hence the period of the undulations the cords undergo on the said surface to be determined. The amplitude of these undulations is obtained directly from the quantity of strip supplied on each rotation of the receiving surface (2), since this is the quantity which determines the angle of inclination of the levers (27 and 28) by "pushing" the connecting arm (21).

It will also be appreciated that it is important to take account of the nature of the cord. The tighter the cord, the less the action of the electromagnet is decisive. The force exerted by the latter therefore needs to be adjusted, depending on whether the cord is metal or textile.

Similarly, in order easily to modify the amplitude of the undulations of the cords and hence of the strip on the receiving surface (2) in order, as was seen at the beginning of the text, to arrive at amplitudes which differ continuously in dependence on the radial position of the cords, all that needs to be done is to modify the quantity of strip supplied on each rotation of the surface (2) and hence the speed V1. The amplitude of the undulations is adjusted by itself, as was seen above. The system is thus very simple to adapt for modifications of the desired undulations.

The invention claimed is:

1. Apparatus for applying to a rotary receiving surface, a reinforcing strip comprising a set of parallel yarns or cords which are generally coated in a rubber mix and arranged in a longitudinal direction of the strip, the strip having a predetermined width extending transversely of the longitudinal direction, the apparatus comprising:

a supply mechanism for supplying the strip;

a laying mechanism for laying the strip onto the receiving surface; and a displacement mechanism disposed between the supply mechanism and the laying mechanism for displacing the strip transversely with respect to a direction in which the strip is laid on the receiving surface, whereby the laid strip forms an undulating pattern;

wherein the displacement mechanism includes a guide through which the strip passes and a guide moving mechanism including a pair of first shafts rotatably drivable about respective parallel axes oriented perpendicular to the strip's longitudinal direction, the first shafts being operably connected to the guide and rotatable relative thereto at respective speeds that are equal, the connection between the first shafts and the guide comprising two second shafts freely rotatably mounted to the guide, and two levers each including a first end pivotably connected to a respective first shaft by a first pivot and a second end pivotably connected to a respective second shaft by a second pivot oriented parallel to the first pivot, the levers oriented non-parallel to the shaft to provide an eccentric connection between each first shaft and the guide and to produce an alternating movement of the guide, wherein the supply mechanism is arranged to supply the strip to the displacement mechanism in the longitudinal direction of the strip with a plane of the strip oriented substantially perpendicular to an axis of rotation of the receiving surface, and the laying mechanism is arranged to cause the strip to pivot by substantially ninety degrees about an axis oriented substantially parallel to the strip's longitudinal direction to lay the strip on the receiving surface tangentially with respect thereto.

2. The apparatus according to claim 1 further including a body; the supply mechanism including at least one rotary capstan mounted on the body and around which the strip is fed, wherein an amplitude of the alternating transverse displacement is a function of a ratio between a first speed of the portion of the strip approaching the displacement mechanism and a second speed of the receiving surface.

3. The apparatus according to claim 2 wherein the first speed comprises a rotary speed of the capstan, and the second speed comprises a rotary speed of the receiving surface.

4. The apparatus according to claim 3 wherein the guide-moving mechanism is further arranged to move the guide in a plane which contains the axis about which the guide rotates and which is oriented substantially perpendicular to the strip's longitudinal direction, to vary the amplitude of the transverse displacement.

5. The apparatus according to claim 4 wherein a period of the alternating transverse movement of the strip is proportional to the rotary speed of the shafts.

6. The apparatus according to claim 5 wherein the magnitude of the centricity of the connection is variable to adjust the amplitude of the alternating transverse movement.

7. The apparatus according to claim 6 wherein the guide comprises an arm carrying two freely rotatable guiding rollers between which the strip passes, the guiding rollers rotatable about respective axes oriented perpendicular to the strip's longitudinal direction.

8. The apparatus according to claim 6 wherein the displacement mechanism further comprises a magnet arranged to apply a magnetic force urging the guide in a direction for producing the eccentricity of the connection between each shaft and the guide.

* * * * *